(12) United States Patent
Savakis et al.

(10) Patent No.: US 7,494,081 B2
(45) Date of Patent: Feb. 24, 2009

(54) GRIPS FOR FISHING REELS

(75) Inventors: Angelo N. Savakis, Chagrin Falls, OH (US); Daniel E. Broadbent, Chagrin Falls, OH (US); Mark Shull, Mogadore, OH (US)

(73) Assignee: Reel Grip, Ltd., Wadsworth, OH (US)

( * ) Notice: Subject to any disclaimer, the term of this patent is extended or adjusted under 35 U.S.C. 154(b) by 0 days.

(21) Appl. No.: 11/297,839

(22) Filed: Dec. 7, 2005

(65) Prior Publication Data

US 2006/0283999 A1 Dec. 21, 2006

Related U.S. Application Data

(60) Provisional application No. 60/690,799, filed on Jun. 15, 2005.

(51) Int. Cl.
*A01K 89/01* (2006.01)
(52) U.S. Cl. ............ 242/283; 242/323; 74/551.9; 16/421
(58) Field of Classification Search ............. 242/283, 242/310, 323; 16/421; 81/20, 177.1; 74/551.9; 428/34.9, 36.8, 36.9; 473/298, 300
See application file for complete search history.

(56) References Cited

U.S. PATENT DOCUMENTS

| | | | | | |
|---|---|---|---|---|---|
| 35,292 | A | * | 5/1862 | Bogia | 30/340 |
| 1,609,117 | A | * | 11/1926 | Hansen | 16/421 |
| 2,222,388 | A | * | 11/1940 | Zimmer | 30/113.3 |
| 2,280,382 | A | * | 4/1942 | Davis | 473/549 |
| 2,431,808 | A | * | 12/1947 | Kluit | 220/755 |
| 2,666,340 | A | * | 1/1954 | Hunt | 74/551.9 |
| D185,613 | S | * | 6/1959 | Price | D8/303 |
| D187,285 | S | * | 2/1960 | Yearley et al. | D8/11 |
| 2,984,486 | A | * | 5/1961 | Jones | 473/568 |
| D201,253 | S | * | 6/1965 | Munson et al. | D7/395 |
| 3,438,413 | A | * | 4/1969 | Borah | 81/177.1 |
| 3,848,871 | A | * | 11/1974 | Sweet et al. | 473/549 |
| D245,064 | S | * | 7/1977 | Petty | D8/303 |
| 4,452,289 | A | * | 6/1984 | Smith | 81/177.1 |
| 4,476,742 | A | * | 10/1984 | Midgley | 74/551.9 |
| 4,593,899 | A | * | 6/1986 | Miller | 482/82 |
| 4,601,598 | A | * | 7/1986 | Schwartz et al. | 401/6 |
| 4,721,021 | A | * | 1/1988 | Kusznir | 81/22 |
| 4,941,232 | A | * | 7/1990 | Decker et al. | 16/421 |
| 4,974,286 | A | * | 12/1990 | Stowell et al. | 16/421 |
| D314,700 | S | * | 2/1991 | Lurkis | D8/303 |
| 5,056,381 | A | * | 10/1991 | Carmein | 76/103 |
| 5,056,945 | A | * | 10/1991 | Klodt | 401/6 |
| 5,097,566 | A | * | 3/1992 | Decker et al. | 16/421 |
| 5,292,087 | A | * | 3/1994 | Sato | 242/268 |
| 5,683,050 | A | * | 11/1997 | Murayama et al. | 242/283 |
| 5,906,323 | A | * | 5/1999 | Morimoto et al. | 242/283 |

(Continued)

*Primary Examiner*—Emmanuel M Marcelo
(74) *Attorney, Agent, or Firm*—Porter, Wright, Morris & Arthur, LLP

(57) ABSTRACT

A grip for a fishing reel handle knob includes a tubular-shaped main wall having a longitudinally extending central axis and forming a longitudinally extending interior passage sized and shaped for receiving the handle knob and a plurality of gripping flanges extending from an exterior surface of the main wall. The main wall and the gripping flanges are each preferably formed of a resiliently flexible material so that the grip is resiliently secured to the handle knob with elastic action and the gripping flanges resiliently deform when the knob is grasped by the user.

26 Claims, 4 Drawing Sheets

U.S. PATENT DOCUMENTS

| | | | | |
|---|---|---|---|---|
| 5,934,587 A * | 8/1999 | Yamaguchi | ............... | 242/283 |
| 6,197,392 B1 * | 3/2001 | Jones | ............... | 428/34.9 |
| RE37,190 E * | 5/2001 | Stowell et al. | ............... | 16/422 |
| 6,240,600 B1 * | 6/2001 | Petruska, Jr. | ............... | 16/421 |
| 6,273,626 B1 * | 8/2001 | Yazawa | ............... | 401/6 |
| 6,375,373 B2 * | 4/2002 | Izushima | ............... | 401/6 |
| 6,464,158 B1 * | 10/2002 | Sakurai | ............... | 242/283 |
| 6,666,396 B2 * | 12/2003 | Landwerlen | ............... | 242/283 |
| 7,044,020 B2 * | 5/2006 | Rosenthal | ............... | 74/551.9 |
| 2002/0185562 A1 * | 12/2002 | Landwerlen | ............... | 242/283 |
| 2005/0097708 A1 * | 5/2005 | Crawford | ............... | 16/431 |

\* cited by examiner

GRIPS FOR FISHING REELS

CROSS-REFERENCE TO RELATED APPLICATIONS

This application claims the priority benefit of U.S. Provisional Patent Application No. 60/690,799 filed on Jun. 15, 2005, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to grips for handles and, more particularly, to grips for crank handles such as crank handles of fishing reels.

BACKGROUND OF THE INVENTION

Typically, a fishing reel includes a drive shaft which rotates to wind fishing line onto a spool. A crank or handle arm is typically fixed to an end of the drive shaft and a handle knob is rotatably secured to an end of the handle arm. Often, a pair of handle knobs are provided with one located at a first end of the handle arm and the other handle knob located at the other end of the handle arm. The user pinches the handle knob between fingers and rotates the handle arm so that rotational motion is transmitted to the reel mechanism through the drive shaft and the fishing line is wound onto the spool.

Fishing reel handle knobs are available in a variety of sizes and shapes. However, most prior handle knobs have poor holding feeling and poor slippage prevention. Poor holding feeling can result in poor control, improper form, and even fatigue. Many attempts have been made to correct these deficiencies. For example, see U.S. Pat. No. 5,660,344, the disclosure of which is expressly incorporated herein in its entirety by reference, which discloses a fishing reel handle that is pivotably secured to a shaft that is rotatably secured to the end of the handle arm. A padded cover is provided on the handle and is secured to the handle by end caps. Additionally, see U.S. Pat. No. 5,683,050, the disclosure of which is expressly incorporated herein in its entirety by reference, which discloses a fishing reel handle that supposedly provides a natural grip and easy fishing line removal. Furthermore, see U.S. Pat. No. 6,666,396, the disclosure of which is expressly incorporated herein in its entirety by reference, which discloses handle knobs that are connected the handle arm with ball-and-socket connections.

While these attempts to improve fishing reel handle knobs may somewhat improve holding feeling and/or slippage prevention they each depart dramatically from traditional feel of fishing reels in that they change the movement and/or shape of the handle knobs. Additionally, there is an ongoing desire to improve the holding feeling and slippage prevention of fishing reel handles. Accordingly, there is a need in the art for improved fishing reels.

SUMMARY OF THE INVENTION

The present invention provides grips for fishing reels which overcome at least some of the above-noted problems of the related art. According to the present invention, a grip for a fishing reel handle knob comprises, in combination, a tubular-shaped main wall having a longitudinally extending central axis and forming a longitudinally extending interior passage sized and shaped for receiving the handle knob and a plurality of gripping flanges extending from an exterior surface of the main wall. The main wall and the gripping flanges are each formed of a resiliently flexible material.

According to another aspect of the present invention, a handle arm assembly for a fishing reel comprises, in combination, a handle arm, a knob secured to the handle arm and rotatable relative to the handle arm about a rotational axis, and a grip extending about an exterior periphery of the handle knob and having a plurality of gripping flanges. The gripping flanges are each formed of a resiliently flexible material.

According to yet another aspect of the present invention, a fishing reel comprises, in combination, a handle arm operably secured to a drive shaft for rotation of the drive shaft, a knob secured to the handle arm and rotatable relative to the handle arm about a rotational axis, and a grip extending about an exterior periphery of the handle knob and having a plurality of gripping flanges. The gripping flanges are each formed of a resiliently flexible material.

From the foregoing disclosure and the following more detailed description of various preferred embodiments it will be apparent to those skilled in the art that the present invention provides a significant advance in the technology and art of fishing reels. Particularly significant in this regard is the potential the invention affords for providing a high quality, reliable, relatively inexpensive, slip resistant grip that provides desired control to the operator. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
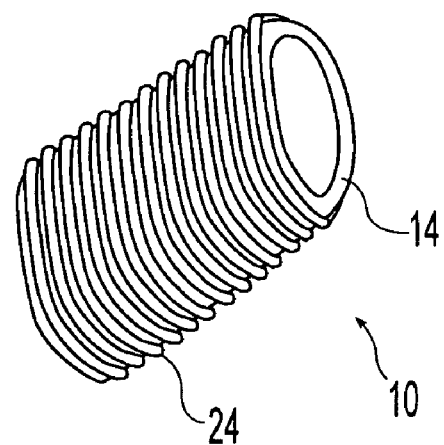
FIG. 1 is a perspective view of a grip for a fishing reel handle knob according to a preferred embodiment of the present invention.
Figure 4:
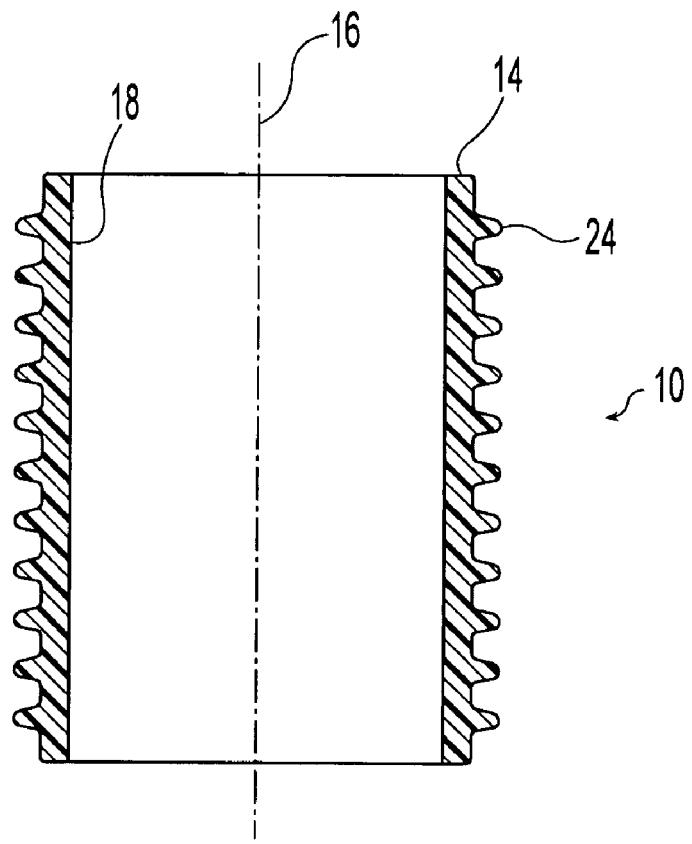
FIG. 4 is a cross-sectional view of the grip of FIGS. 1 to 3 taken along line 4-4 of FIG. 3.
Figure 2:
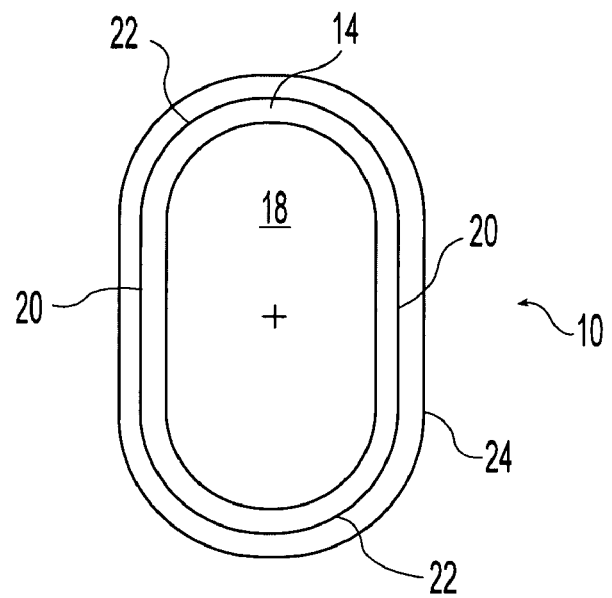
FIG. 2 is a top plan view of the grip of FIG. 1.
Figure 3:
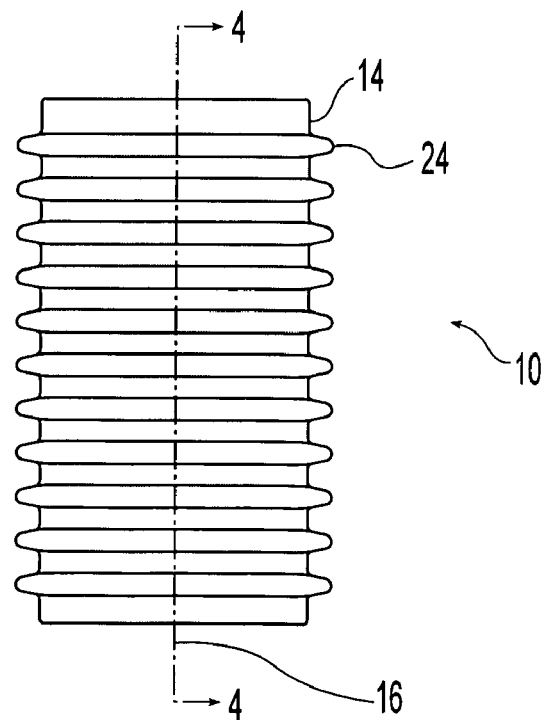
FIG. 3 is a side elevational view of the grip of FIGS. 1 and 2.

It should be understood that the appended drawings are not necessarily to scale, presenting a somewhat simplified representation of various preferred features illustrative of the basic principles of the invention. The specific design features of grips for fishing reels as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the items illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved grips for fishing reel handle knobs disclosed herein. The following detailed discussion of various alternative and preferred embodiments will illustrate the general principles of the invention with reference to particular fishing reel handle knobs. Other embodiments suitable for other applications will be apparent to those skilled in the art given the benefit of this disclosure.

Referring now to the drawings, FIGS. 1 to 4 show a grip 10 for use on a fishing reel handle knob 12 (shown in FIGS. 5 to 7) according to a preferred embodiment of the present invention. The illustrated grip 10 is generally tubular-shaped having a main wall 14 about a longitudinally-extending central axis 16 and forming a longitudinally-extending interior passage 18 therein. The illustrated grip 10 is open at each longitudinal end so that the passage 18 extends entirety through the grip 10. It is noted, however, that at least one of the longitudinal ends of the grip 10 can alternatively be closed. The main wall 14 and the passage 18 are sized and shaped so that the fishing reel handle knob 12 (shown in FIGS. 5 to 7) can be closely received in the passage 18 to secure the grip 10 about the fishing reel handle knob 18 as described in more detail hereinafter. The illustrated main wall 14 is generally oval-shaped in cross section having a pair of substantially straight portions 20 spaced apart and connected by a pair of curved or half-circle portions 22 connecting ends of the straight portions 20. The illustrated oval-shaped main wall 14 provides the interior passage 18 with a generally oval shape. The passage 18 is sized and dimensioned so that the grip 10 fits onto a fishing reel handle knob 12 as described in more detail hereinafter. The illustrated main wall 12 has a thickness of about 0.052 inches and a length of about 1.099 inches. The illustrated passage 18 has a length of about 0.7972 inches and a width of about 0.4337 inches. It is noted that the main wall 12 and the passage 18 can be sized and shaped in many other manners for use with other fishing reel handle knobs having different sizes and/or shapes.

The illustrated grip 10 also has a plurality of gripping ribs or flanges 24 extending from the exterior surface of the main wall 14 so that the exterior surface of the main wall 14 is a slip resistant. The illustrated gripping flanges 24 extend outwardly from the exterior surface of the main wall 14 and extend about the entire periphery of the main wall 14 so that they are substantially perpendicular to the central axis 16. The illustrated gripping flanges 24 are substantially parallel and longitudinally spaced-apart along the length of the grip 10. The illustrated grip 10 is provided with eleven of the gripping flanges 24 but it is noted that a larger or smaller quantity of the gripping flanges 24 can alternatively be utilized. The illustrated gripping flanges 24 are spaced apart by about 0.091 inches but any other suitable spacing can be alternatively utilized. Preferably the gripping flanges 24 are resiliently deflectable when gripping the exterior surface of the main wall 14. The illustrated gripping flanges 24 have a length of about 0.051 and sides inclined at an angle of about 10 degrees so that the free ends are narrower than the fixed ends of the gripping flanges 24 but any other suitable size and shape can alternatively be utilized. The illustrated gripping flanges also have free ends that are rounded or radiused. The illustrated free ends of the flanges 24 have a radius of about 0.016 inches but any other suitable radius can alternatively be utilized. It is noted that the gripping flanges 24 can be sized and shaped in other manners so that the exterior surface of the main wall 14 is slip resistant.

The illustrated grip 10 is formed of a resiliently deformable material, that is, an elastic material such that the grip 10 can be resiliently deformed to generally conform to the exterior shape of the handle knob 12. Preferably, the main wall 14 is sized and shaped so that there is an interference or near interference fit between the grip 10 and the handle knob 12 to secure the grip 10 to the handle knob 12 using the resiliency of the grip 10. That is, that the grip 10 is sized and shaped so that it is nearly the same size smaller than then handle knob 12 when the grip 10 is in a free state but can be resiliently expanded when placed over the handle knob 12 so that the grip 10 is resiliently deformed to elastically grip the handle knob 12 to secure the grip 10 to the handle knob 12. Additionally, the gripping flanges 24 are resiliently deformable as the user grasps the grip 10 located about the handle knob 12. The grip is preferably formed of rubber but can alternatively be formed of an elastomer, plastic, or other suitable material. The illustrated grip 10 is formed as a single unitary body of a single material. It is noted that the grip 10 can alternatively be formed of multiple components and/or materials if desired.

Figure 5:
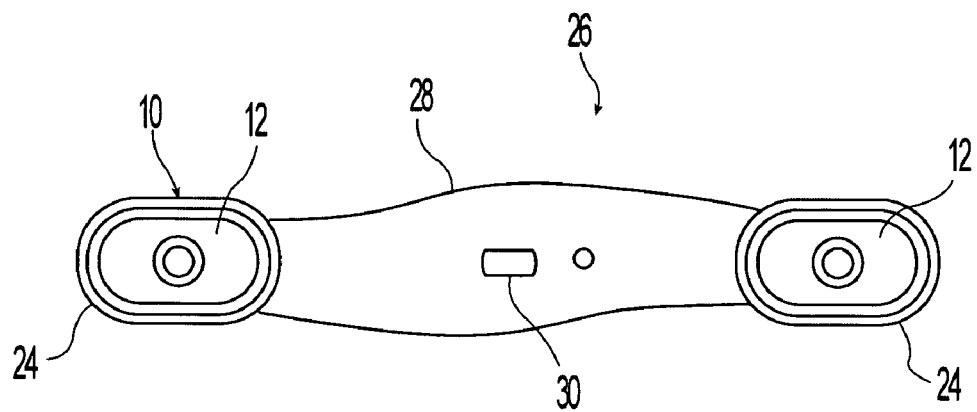
FIG. 5 is top plan view of a fishing reel handle incorporating the grips of FIGS. 1 to 4.
Figure 6:
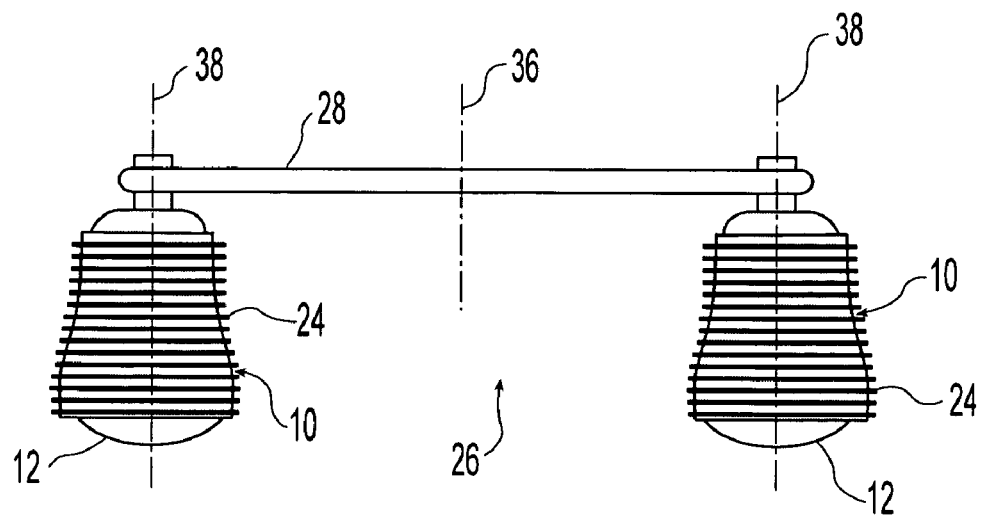
FIG. 6 is a side elevational view of the fishing reel handle of FIG. 5.

FIGS. 5 and 6 show a fishing reel handle assembly 26 according to a preferred embodiment of the present invention. The illustrated handle assembly 26 includes a handle or crank arm 28, a pair of handle knobs 12, and a pair of the grips 10 located about the periphery of the handle knobs 12. The illustrated handle arm 28 includes a square opening 30 suitable for receiving a drive shaft 32 of a fishing reel 34 (best shown in FIG. 7) so that the handle arm 28 transmits rotary motion to the drive shaft 32 about a drive shaft rotational axis 36. It is noted that alternatively any other suitable connection can be provided for the drive shaft 32. The handle knobs 12 are rotatably secured to the handle arm 28 near opposite ends of the handle arm 28. The handle knobs 12 are secured so that they are rotatable relative to the handle arm 28 about a longitudinally-extending rotational axis 38 substantially parallel to the drive shaft rotational axis 32. The grips 10 are located on the outer surface of the handle knobs 14. The grips 10 are preferably secured to the knobs 12 by the elastic deformation of the grips 10 but can alternatively be secured in any other suitable manner. Provided in this manner, the gripping flanges 24 are generally perpendicular to the rotational axes 36, 38 of both the handle knobs 12 and the handle arm 28 and are generally parallel with the handle arm 28. It is noted that the handle arm assembly 28 can have many other forms within the scope of the present invention such as, for example, there can be only one handle knob 12 or more than two handle knobs 12.

Figure 7:
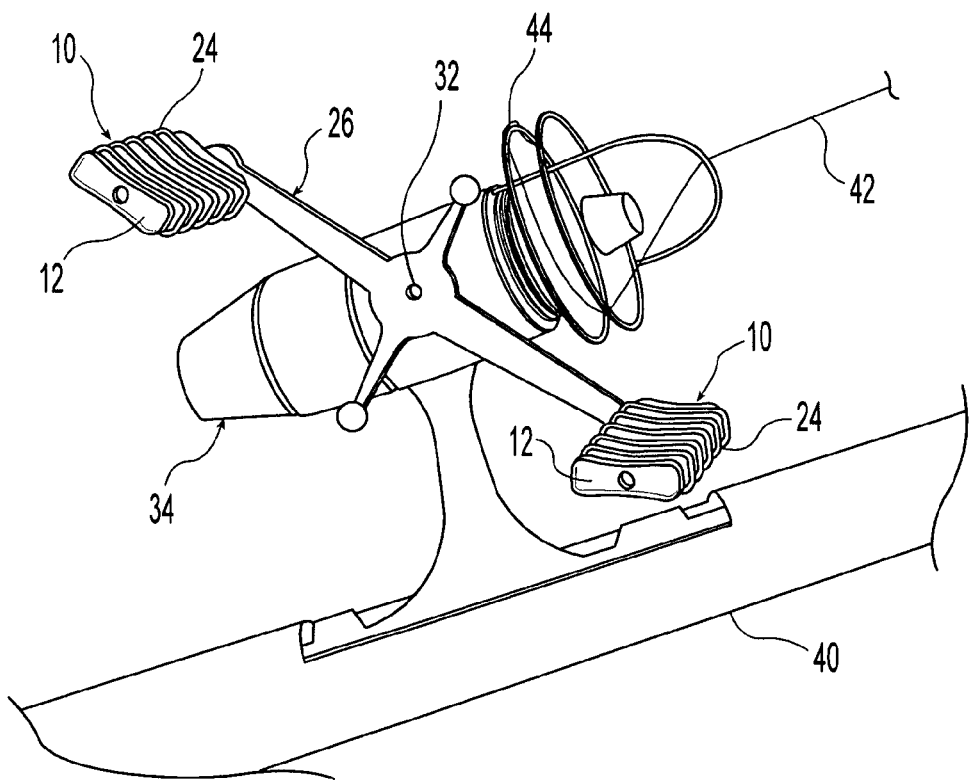
FIG. 7 is a fragmented perspective view of a fishing pole having a fishing reel incorporating the grips of FIGS. 1 to 4.

FIG. 7 shows a fishing rod 40 having a fishing reel 34 according to a preferred embodiment of the present invention. The fishing reel 34 can be of any suitable type having a handle or crank arm 28 that is operated to wind fishing line 42 onto a spool 44. The illustrated reel 34 has the handle arm 28 secured to the drive shaft 32 so that rotation of the handle arm 28 rotates the drive shaft 32 to cause the line 42 to be wound on the spool 44. It is noted that the reel 34 can alternatively have many other forms within the scope of the present invention. When it is desired to wind or unwind the line 42, the operator grasps one of the handle knobs 12 and rotates the handle arm 28 about the rotational axis 36 as desired. When grasping the handle knob 12, the operator engages the exterior surface of the grip 10 rather than the exterior surface of the knob 12 and resiliently deflects the gripping flanges 24. Grasped in the manner, the operator is engaging a slip-free surface to obtain precise control when operating the reel 34.

It is apparent from the above detailed description, that the grips 10 can be sold as an aftermarket accessory to be purchased by fisherman for use with fishing reels 34 already owned, as part of a handle assembly 28 sold as a replacement kit for a fishing reel 34, or as a part of an original equipment fishing reel 34. Additionally, it is apparent from the above description that the grips 10 can be adapted for use with a wide variety of models of fishing reels 34. Furthermore, it is apparent from the above description that the grips 10 can be a separate component from the handle knobs 28 which can be installed to the handle knobs 28 for use and removed for replacement or can be formed as an integral component with the handle knobs 28 such as, for example, by co-molding or over-molding. Moreover, it is apparent from the above description that the grips 10 provide a slip resistant surface that adds comfort and grip resulting in better feel and control and less strain and fatigue.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention when interpreted in accordance with the benefit to which it is fairly, legally, and equitably entitled.

What is claimed is:

1. A handle arm assembly for fishing reel comprising, in combination:
    a handle arm;
    a knob secured to the handle arm and rotatable relative to the handle arm about a rotational axis;
    a removable grip extending about an exterior periphery of the handle knob and having a plurality of gripping flanges;
    wherein the grip includes a tubular-shaped main wall having a longitudinally extending central axis and forming a longitudinally extending interior passage receiving the handle knob;
    wherein the main wall is formed of a resiliently flexible material;
    wherein the main wall and the passage are sized and shaped so that the main wall can be elastically expanded to place the grip onto the knob;
    wherein the main wall is resiliently deformed to conform to an exterior shape of the knob so that the main wall elastically grips the knob to secure the grip to the handle knob
    wherein the gripping flanges are each formed of a resiliently flexible material; and
    wherein the gripping flanges are sized and shaped to resiliently deform when a user grasps the grip between fingers.

2. The handle arm assembly according to claim 1, wherein the main wall and the gripping flanges are each formed of silicone rubber.

3. The handle arm assembly according to claim 1, wherein the main wall and the gripping flanges are formed as a single one-piece component.

4. The handle arm assembly according to claim 1, wherein the main wall is generally oval shaped in cross-section when in a free undeformed state.

5. The handle arm assembly according to claim 1, wherein each longitudinal end of the passage is open.

6. The handle arm assembly according to claim 1, wherein each of the gripping flanges extend generally perpendicular to the rotational axis and entirely about a periphery of the grip.

7. handle arm assembly according to claim 6, wherein the gripping flanges are substantially parallel and longitudinally spaced apart.

8. The handle arm assembly according to claim 1, wherein the gripping flanges are sized and shaped to resiliently deform in a longitudinal direction when a user grasps the grip.

9. The handle arm assembly according to claim 1, wherein the gripping flanges have sides inclined so that free ends of the gripping flanges are narrower than fixed ends of the gripping flanges.

10. The fishing reel according to claim 9, wherein the sides are inclined at an angle of about 10 degrees and the gripping flanges have free ends that are rounded.

11. The handle arm according to claim 1, wherein the main wall has a different shape when in a free undeformed state than when resiliently deformed to conform to the exterior shape of the knob.

12. The handle arm according to claim 1, wherein the main wall has a thickness substantially equal to a length of the gripping flanges.

13. The handle arm according to claim 1, wherein the exterior shape of the knob is nonuniform in a longitudinal direction.

14. A fishing reel comprising, in combination:
    a handle arm operably secured to a drive shaft for rotation of the drive shaft;
    a knob secured to the handle arm and rotatable relative to the handle arm about a rotational axis;
    a removable grip extending about an exterior periphery of the handle knob and having a plurality of gripping flanges;
    wherein the grip includes a tubular-shaped main wall having a longitudinally extending central axis and forming a longitudinally extending interior passage receiving the handle knob;
    wherein the main wall is formed of a resiliently flexible material;
    wherein the main wall and the passage are sized and shaped so that the main wall can be elastically expanded to place the grip onto the knob;
    wherein the main wall is resiliently deformed to conform to an exterior shape of the knob so that the main wall elastically grips the knob to secure the grip to the handle knob
    wherein the gripping flanges are each formed of a resiliently flexible material; and
    wherein the gripping flanges are sized and shaped to resiliently deform when a user grasps the grip between fingers.

15. The fishing reel according to claim 14, wherein the main wall and the gripping flanges are each formed of silicone rubber.

16. The fishing reel according to claim 14, wherein the main wall and the gripping flanges are formed as a single one-piece component.

17. The fishing reel according to claim 14, wherein the main wall is generally oval shaped in cross-section when in a free undeformed state.

18. The fishing reel according to claim 14, wherein each of the gripping flanges extend generally perpendicular to the rotational axis and entirely about a periphery of the grip.

19. The fishing reel according to claim 18, wherein the gripping flanges are substantially parallel and longitudinally spaced apart.

20. The fishing reel according to claim 14, wherein the gripping flanges are sized and shaped to resiliently deform in a longitudinal direction when a user grasps the grip.

21. The fishing reel according to claim 14, wherein the gripping flanges have sides inclined so that free ends of the gripping flanges are narrower than fixed ends of the gripping flanges.

22. The fishing reel according to claim 21, wherein the sides are inclined at an angle of about 10 degrees and the gripping flanges have free ends that are rounded.

23. The fishing reel according to claim 14, wherein the main wall has a different shape when in a free undeformed state than when resiliently deformed to conform to the exterior shape of the knob.

24. The fishing reel according to claim 14, wherein the main wall has a thickness substantially equal to a length of the gripping flanges.

25. The fishing reel according to claim 14, wherein the exterior shape of the knob is nonuniform in a longitudinal direction.

26. The fishing reel according to claim 14, wherein each longitudinal end of the passage is open.

* * * * *